Patented Oct. 18, 1927.

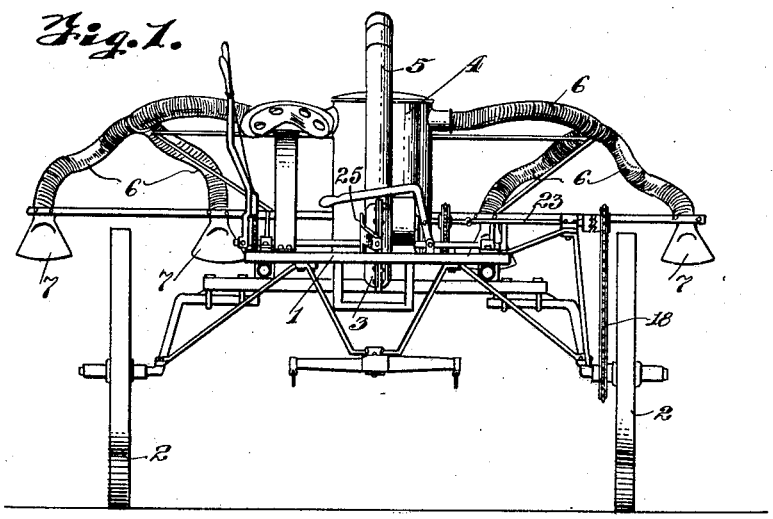
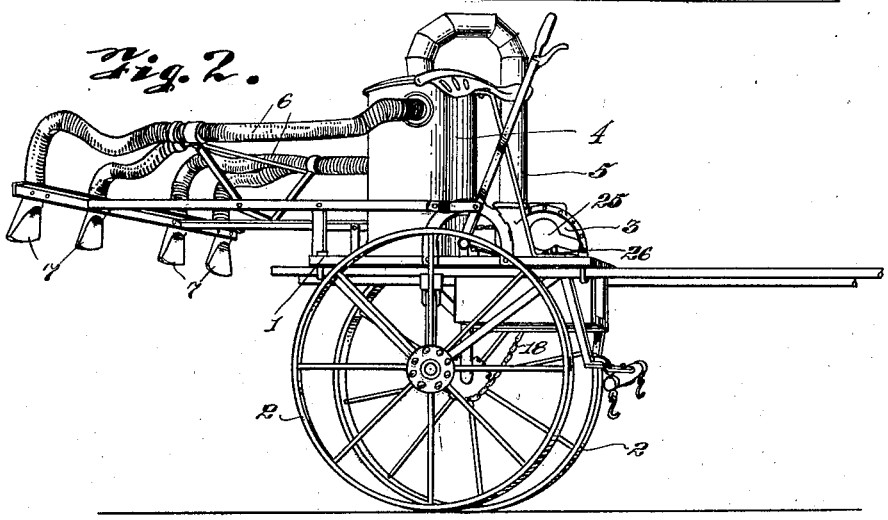

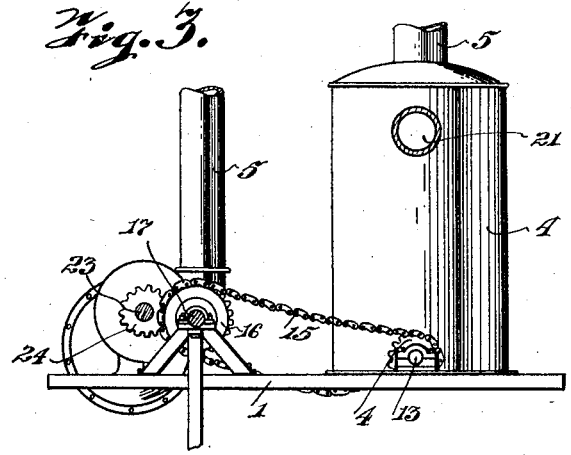
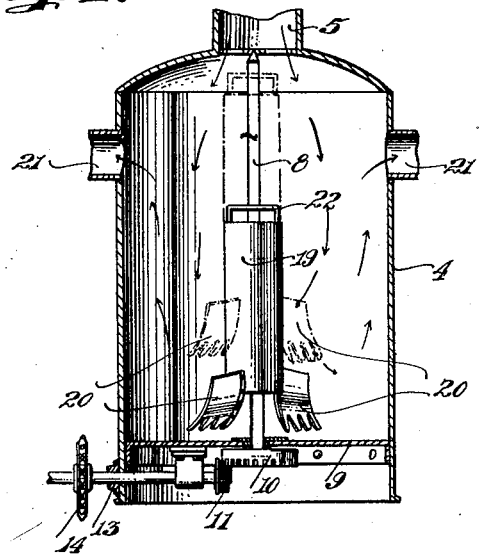

1,646,224

UNITED STATES PATENT OFFICE.

WILLIAM H. THOMPSON, OF WICHITA FALLS, TEXAS, ASSIGNOR OF ONE-THIRD TO FRED S. REASER AND ONE-THIRD TO J. W. DUNCAN, BOTH OF WICHITA FALLS, TEXAS.

COTTON-DUSTING MACHINE.

Application filed February 18, 1927. Serial No. 169,235.

This invention relates to machines designed for the extermination of insects, especially boll weevils, worms, fleas and similar insects of hindrance to the production of cotton and produces, its principal object residing in the provision of an improved insecticide dispensing hopper capable of establishing equal distribution of poison, usually in the form of powder, generally calcium arsenic or sulphur.

The invention further aims among its objects to provide a means for controlling an air draft through the hopper, hence to govern the quantity of poison dispensed therefrom in this manner.

Broadly, the invention comprehends a machine having such operative facilities as to enable it to evenly and definitely distribute insecticide through a series of distributing conduits accordingly with the air force supplied by a blower, and consequently prevent waste of the material used according to other methods.

With these foremost objects in view, the invention has particular reference to certain novel features of construction, referred to in detail in the course of the following description and illustrated in the accompanying drawings, wherein:

Figure 1 represents a front end elevation of a machine constructed according to the present invention.

Figure 2 is a side elevational view thereof.

Figure 3 is a detail view of the hopper and blower attached, and

Figure 4 is an axial cross sectional view of the hopper.

Continuing now more in detail with the drawings, in Figures 1 and 2 is illustrated a preferred embodiment of the invention composed primarily of a platform 1, supported upon wheels 2. A blower 3, the construction of which is commonly known, is supported upon the platform, near the front and immediately behind the blower is mounted a hopper 4 of any suitable capacity. A conduit 5, preferably rigid is supplied as a conveyance of air from the blower 3 to the hopper 4, whence the air, together with the agitated poison contained within the hopper is carried under pressure in equally distributed quantities into the flexible distributing conduits 6, thence through distributing nozzles 7 directly onto the vegetation over which the machine is being drawn, either by horses, engine or other means of traction. The conduits 5 and 6, as well as other details of construction being well known in the art, the description will not dwell thereon at length.

Referring now particularly to Figures 3 and 4, the invention is illustrated as comprising primarily, a square or flat rod 8 vertically mounted in rotatable relationship within the hopper 4, and passing through its bottom 9 the rod has affixed thereto a crown wheel 10, with downwardly directed teeth, which are engaged by a gear 11 affixed to a lateral shaft 12 protruding through a bearing 13 at the side of the hopper, and upon which a sprocket wheel 14 is mounted. As apparent in Figure 3, a chain 15 surrounds this sprocket, and another 16, which in turn is mounted upon a shaft 17, driven though a chain 18 from the hub of the wheel 2. See Figure 1.

Returning to the hopper 4, the centrally mounted rod 8 has slidably supported thereon a cylindrical member 19, near the bottom of which is attached agitating wings 20, arranged diametrically opposite. As indicated above, and suggested by the broken lines on the drawing, the member 19 is capable of vertical sliding movement on the rod 8 as the contents of the hopper are depleted and blown according to the direction of the arrows through the ports 21 communicating with the conduits 6. The member 19 is held against revolving except with the rod 8, since the rod is passed through a slot in the bail 22 at the top of the member 19.

In operation, a quantity of powder is placed within the hopper 4 and the member 19 lifted by the bail 22 until the agitator wings 20 rest upon top of the commodity. When the machine is drawn over the rows of vegetation, the blower 3 is operated through a shaft 23 in which is mounted the sprocket 18, mentioned previously, which likewise imparts driving power to shaft 17 through gear 24 also carried by shaft 23.

The constant draft of air created by the blower 3 enters the hopper 4 at its top through conduit 5, and aided by the fast revolving agitator 19, forces the commodity in equalized volume out through ports 21, flexible conduits 6 and distributor nozzles 7, To alter the current of air supplied by the blower 3, a sliding plate 25 is pivotally mounted adjacent the intake port 26 in the blower and arranged to be moved relative to the port to lessen or increase the intake thereof, consequently controlling the air finally entering the hopper 4.

It is obvious that since the member 19 is supported lightly upon the commodity, its penetration is slight and consequently agitates only that immediately on the surface of the bulk of sufficient volumes to be caught up by the air and discharged, and at no time is it possible for the machine to discharge a volume in excess to the desired amount, except through the adjustment supplied by the plate 25.

Manifestly, the construction described and illustrated is capable of considerable variation and such variation as is in keeping with the appended claims is also considered within the scope of the invention.

What is claimed is:

1. In an insect exterminating machine, the combination with a hopper, a blower and a series of flexible discharge conduits, of a vertical shaft in said hopper; a cylindrical member capable of unrestricted vertical movement on said shaft, agitator wings carried by said member near the bottom thereof, and means to cause rotation of said shaft to effect consequent rotation of said cylindrical member.

2. In an insect exterminating machine, the combination with a poison hopper, a blower and a series of flexible discharge conduits, a poison agitating means for said hopper comprising a rotatable shaft vertically mounted in said hopper; a cylindrical member slidably carried by said shaft and rotatable with said shaft; agitating wings carried by said cylindrical member and arranged to ride upon the surface of said poison when operated, and means to cause rotation of said shaft to effect consequent rotation of said agitation member.

3. In an insect exterminating machine, the combination with a powder hopper, air agitating means for said hopper including a shaft mounted vertically in said hopper; a tubular member slidably carried by said shaft and constrained to rotate therewith; agitating wings mounted near the bottom of said tubular member and adapted to penetrate the surface of the powder contents of said hopper to agitate the same, and means to impart rotation to said shaft.

4. In an insect exterminating machine, the combination with the powder hopper and draft supplying means of said machine, an agitating means for said hopper comprising a vertical rotatable shaft mounted therein; a member carried by said shaft capable of vertical sliding movement thereon and constrained to rotate therewith; means carried by said member adapted to penetrate the surface of said powder whereby to agitate the same when said shaft is rotated to be discharged by said air draft.

5. In an insect exterminating machine, the combination with the powder hopper and draft supplying means of said machine, a powder agitating means in said hopper comprising a vertically mounted rotatable shaft in said hopper; a tubular member slidably carried by said shaft and constrained to rotate therewith, and wings affixed to and protruding downwardly from the bottom of said member adapted to constantly stir the surface of said powder when said shaft and tubular member is rotated.

In testimony whereof I affix my signature.

WILLIAM H. THOMPSON.